May 12, 1936.  M. G. ROWE  2,040,567
FISHING LINE WASHER AND DRIER
Filed July 17, 1935   2 Sheets-Sheet 1
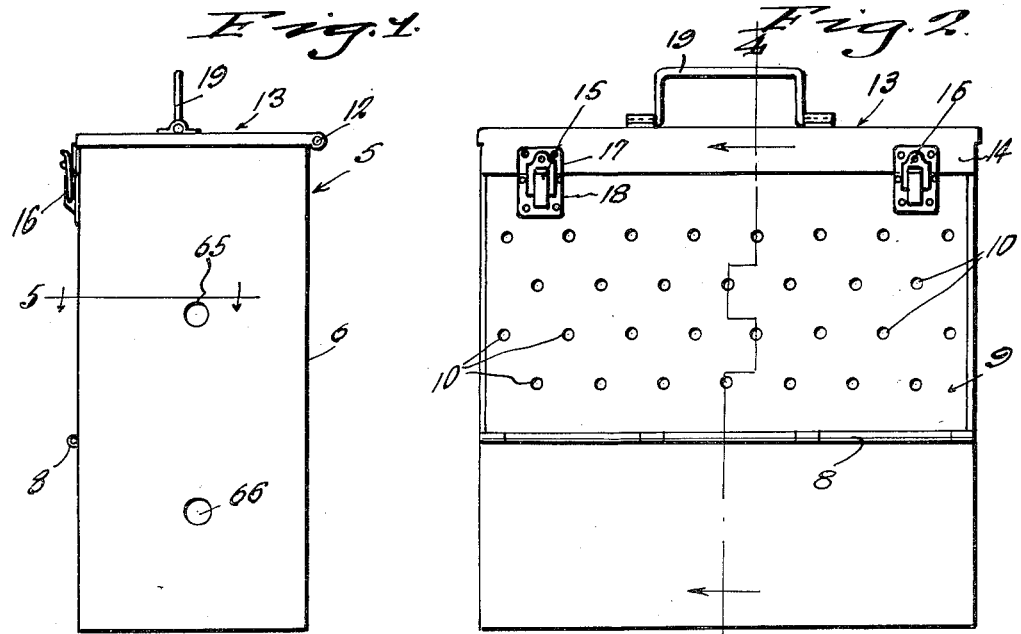
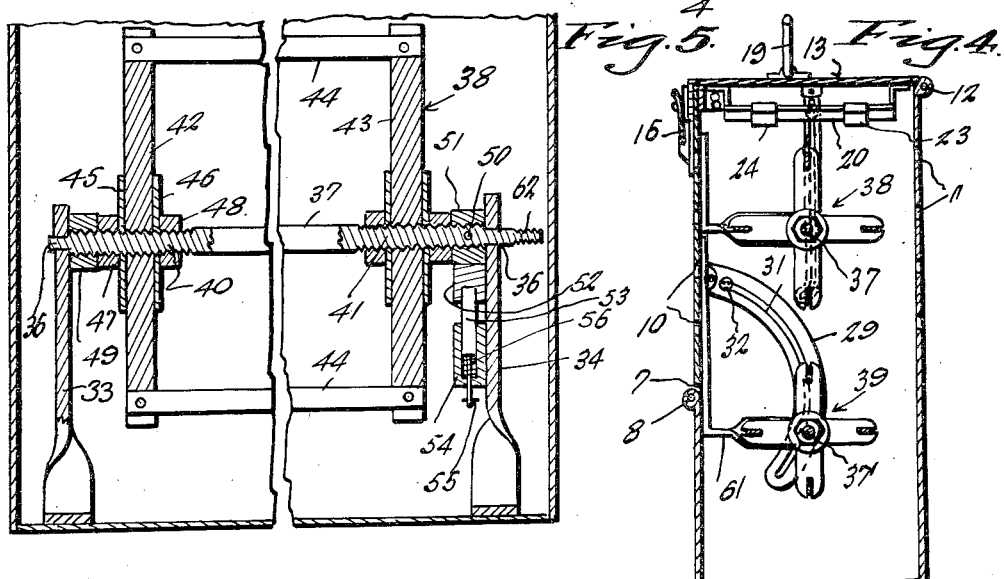
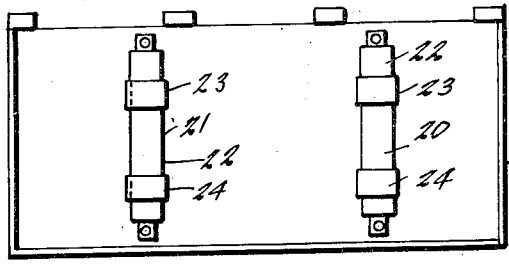
Inventor
M. G. Rowe
By Clarence A. O'Brien
Attorney

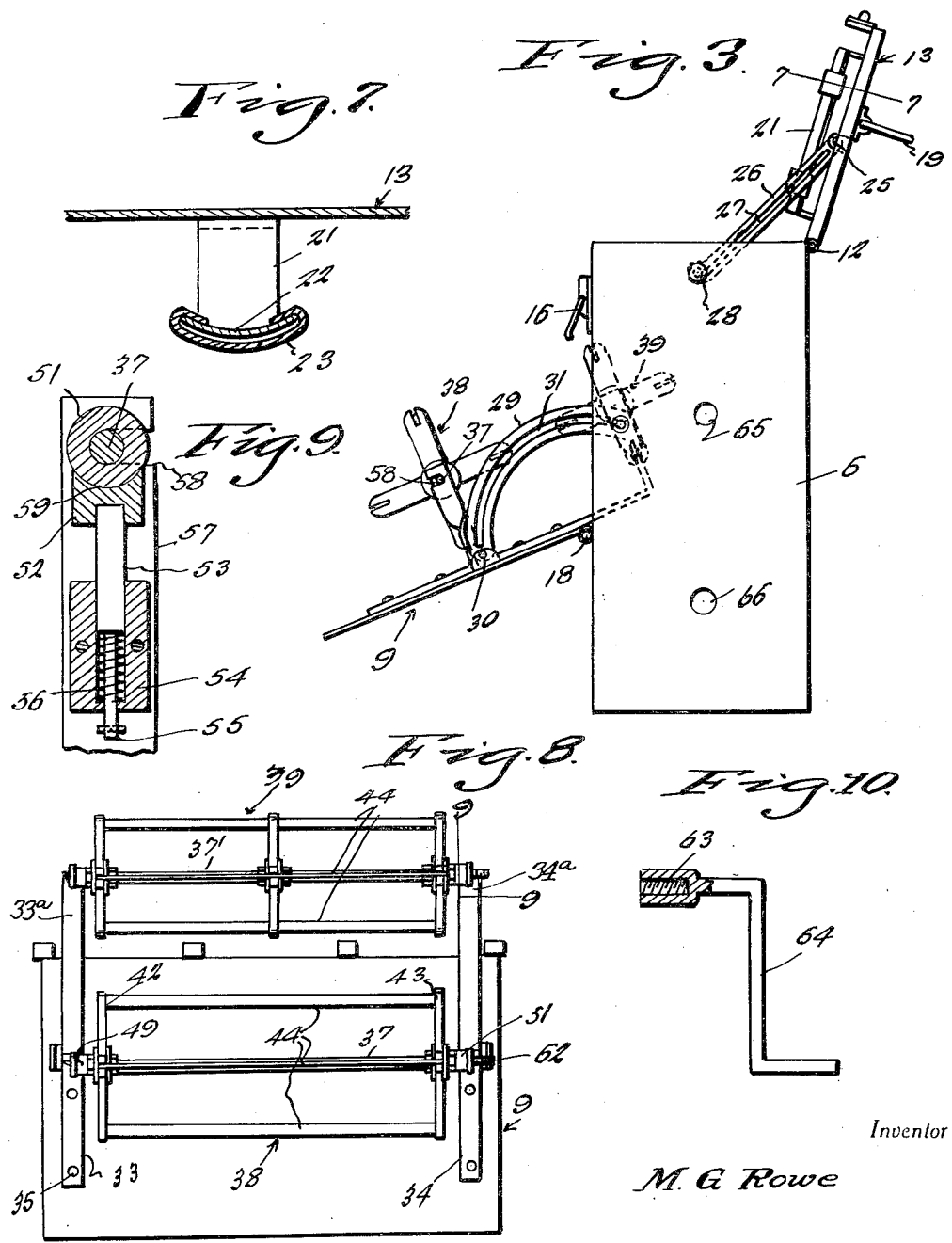

Patented May 12, 1936

2,040,567

UNITED STATES PATENT OFFICE 2,040,567

FISHING LINE WASHER AND DRIER

Marion G. Rowe, Daytona Beach, Fla.

Application July 17, 1935, Serial No. 31,918

2 Claims. (Cl. 141—1)

My invention relates generally to means for washing and drying fishing lines, and particularly to a fisherman's kit containing facilities for washing and drying fishing lines, the kit being small and compact and easily carried by hand, and an important object of my invention is to provide a kit of the character indicated which is simple and efficient and relatively inexpensive, and which enables the fisherman to provide excellent care for his fishing lines after use and while traveling.

Other important objects of my invention will be apparent from a reading of the following description in connection with the drawings, wherein for purposes of illustration I have shown a preferred embodiment of my invention.

In the drawings:

Figure 1 is a right hand end elevational view of the embodiment,

Figure 2 is a front elevational view thereof,

Figure 3 is a right hand end elevational view of the embodiment showing the swingable door and the swingable top in their extreme open positions, Figure 4 is a transverse vertical sectional view taken through Figure 2, approximately on the line 4—4 and looking toward the left in the direction of the arrows, Figure 5 is a horizontal sectional view enlarged and taken approximately on the line 5—5 of Figure 1 and looking downwardly in the direction of the arrows, Figure 6 is a bottom plan view of the swingable top, Figure 7 is a transverse vertical sectional view taken through Figure 3, approximately on the line 7—7, Figure 8 is a top plan view of the swingable door showing the same while in outwardly swung position, Figure 9 is a vertical transverse sectional view through Figure 8 and taken approximately on the line 9—9, Figure 10 is a sectional elevational view of the winding drum operating handle or crank.

Referring in detail to the drawings, the numeral 5 generally designates the kit which is composed of the relatively wide vertically elongated casing 6 which has its front wall open from its top to a point designated by the numeral 7 for the full width thereof. Along the point 7 is the hinge arrangement 8 which may be of any suitable form, which hinges and supports the lower edge of the swingable door 9 which has ventilation holes 10 distributed thereover for ventilating the interior of the casing. Similar ventilation holes 11 are arranged in the back of the casing on a level with the peforations 10, but the lower half of the casing is devoid of such perforations so that water or other cleaning fluid may be properly contained by the lower part of the casing so that the lower winding drum is immersed in the liquid during the line washing operations.

Hinged as indicated by the numeral 12 on the upper edge of the back wall of the casing is the upwardly swingable cover 13 which has on its front end the depending flange 14 which is adapted to overhang the upper edge of the door 9 while the cover 13 is in its closed position. Two latch arrangements 15 and 16 composed of cover sections 17 and door sections 18 are arranged on the outer side of the flange 14 and on the outer side of the door 9 and are engageable in such a way that the door 9 is held closed while the cover is closed and locked. The locking arrangements 15 and 16 need not be locked to enable the cover to hold the door closed as long as the cover remains closed, but the locks must be locked to prevent the cover from opening while the kit is being carried by the handle 19 which is mounted on the top of the cover.

On the bottom of the cover are two transversely spaced mountings 20 and 21 for fishing line reels, these mountings being similarly formed and each composed of a U-shaped strap 22 which is concavo-convex as indicated in Figure 7 to conform in shape to the convexity of the arms on the reels; and along the horizontal portions of the straps 22 are two locking sleeves 23 and 24 which are arranged to be slid over the arms of the reel to hold the arms of the reel engaged with the under side of the straps 22, whereby the reels are securely mounted on the reel mountings 20 and 21. Obviously the slidable arrangement of the retainers 23 and 24 permit mounting reels of different sizes and adjusting the position of the reels within the casing and relative to the winding drums to be described.

The cover has pivoted as indicated at 25 to one side thereof, the upper end of the slotted arm 26 whose slot 27 engages an anchoring pin 28 on the side of the interior of the end of the casing, so that the cover is positively prevented from being swung too far in the open position. A similar but curved slotted bar 29 has its outer end pivoted as indicated at 30 to the inner side of the door 9 and has its slot 31 working on a stationary pin 32 fastened to the end of the casing, whereby the outward swinging movement of the door is positively limited to the declining and draining position illustrated in Figure 3.

Upper L-shaped brackets 33 and 34 have their standard portions fastened as indicated at 35 to the upper part of the inner face of the door so that their foot portions extend horizontally near the opposite side edges and approximately half-way across the casing where the foot portions have openings in which the smooth ends 36 of the upper winding drum axle turn, whereby the upper winding drum generally designated 38 is rotatably supported in the position shown in Figure 4 within the casing and vertically spaced above the lower winding drum which is generally designated 39. The winding drums are similar in construction and only one will be described.

Inwardly of the smooth portions 36 the shaft 37 is threaded at its opposite ends as indicated by the numerals 40 and 41 and on these portions are threaded the opposite heads 42 and 43 which are cruciform as indicated in Figure 4 and in Figure 3 and which have extending therebetween and suitably fastened the longitudinal members 44 on which the fishing line is directly wound. Plates 45 and 46 engage opposite sides of the heads and lock nuts 47 and 48 hold the plates in place. Outward of the left hand nut 47 as shown in Figure 5, there is threaded on the shaft the round spacer 49, while on the opposite end of the shaft and in a similar position is pinned as indicated at 50 the brake drum 51 against which the brake shoe 52 on the stem 53 works, the stem 53 being slidably confined in a block 54 which is fastened to the inner side of the horizontal portion of the upper right hand bracket 34. A plunger 55 works through the block 54 and acts as a handle for retracting the brake shoe 52 against the tension of the spring 56 which is interposed between the block and the brake stem 53. The tension of the spring may be adjusted by suitable means to change the pressure of the brake shoe against the drum 51 to adequately retard rotation of the winding drum as the circumstances may require.

As shown in Figure 9 the upper edge of the horizontal portion of the bracket which is generally designated 57 has the notch 58 which rotatably receives the smooth portion of the shaft 37. It will also be observed that the working face of the brake shoe which is designated 59 has a curvature conforming to that of the brake drum 51, so that the engagement of the brake shoe with the brake band holds the shaft 37 in the bearing notch 58 while the drum is being operated and while the same is at rest. The brake shoe 52 is fastened to the stem 53 so that when the stem is retracted by hand the brake shoe is pulled away from the brake drum 51, so as to release the shaft 37 so that the shaft may be removed from the notch 58. Of course, the opening in the remaining upper bracket is shaped to confine the smooth part of the shaft 37 against all major movements except rotation and movement along the axis thereof, as the notch 58 is sufficient to enable the shaft 37 to be removed from the brackets in an obvious manner.

The lower winding drum 39 is supported by generally similar L-shaped brackets 33a—34a similar to the upper brackets described above, one of the horizontal portions of these brackets being provided with a brake in the manner already described in connection with the upper drum 38. It will be observed that the horizontal parts 61 of the lower brackets are disposed at a level below the lower end of the door and below the upper end of the front wall of the casing, so that the lower drum 39 is carried at the proper level for efficient washing operations of lines wound thereon, in such liquid as may be used for the purpose in the lower part of the casing. The right hand end of the shaft 37' of the lower drum, like the right hand end of the shaft 37 of the upper drum, is threaded as indicated by the numeral 62 to cooperate with the threaded socket 63 on the end of the drum rotating crank 64 which is arranged to be passed through openings 65 and 66 in the right-hand end of the casing and threaded on the parts 62 when it is desired to operate the winding drums.

With a reel placed on the mount 20 or 21, with the lid 13 in open position as shown in Figure 3, the line (which is wet) is paid off onto the reel 39. This reel 39 is the reel which washes the line and when the line has been wound on to the reel 39, the closure 9 is swung up to the closed position shown in Figure 4, thus dipping the reel 39 into the pail of water in the lower portion of the casing 6. The crank 64 can now be inserted through the opening 66 in the casing 5 so that the reel 39 can be rotated. When the washing operation has been completed, the closure 9 can be swung to the position shown in Figure 3 for connecting the line on the reel 39 to the reel 38. The closure 9 can now be closed and the crank 64 inserted through the opening 65 to engage the reel 38. The line is now wound on to the reel 38 where it can remain and on which the same will dry.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A line washing and drying kit comprising a casing having the upper portion of one side wall open, a closure hingedly connected to the casing at the lower end of the said opening, the portion of the casing below the said opening constituting a water compartment, the closure being provided with an extension beyond its hinged end, a line washing reel mounted upon the said extension, a drying reel mounted on the closure at an intermediate point, and means for operating the washing reel when the closure is in closed position and the washing reel depending into the water containing compartment.

2. A line washing and drying kit comprising a casing having the upper portion of one side wall open, a closure hingedly connected to the casing at the lower end of the said opening, the portion of the casing below the said opening constituting a water compartment, the closure being provided with an extension beyond its hinged end, a line washing reel mounted upon the said extension, a drying reel mounted on the closure at an intermediate point, and means for operating the washing reel when the closure is in closed position and the washing reel depending into the water containing compartment, said casing being provided with an elevatable lid, a reel mount on the lid whereby a line can be paid from a reel on the mount to the washing reel.

MARION G. ROWE.